(12) United States Patent
Yao

(10) Patent No.: US 8,797,601 B2
(45) Date of Patent: Aug. 5, 2014

(54) METHOD AND SYSTEM FOR PRESERVING IMAGE QUALITY IN AN ECONOMY PRINT MODE

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 161 days.

(21) Appl. No.: 13/427,317

(22) Filed: Mar. 22, 2012

(65) Prior Publication Data

US 2013/0250363 A1    Sep. 26, 2013

(51) Int. Cl.
*H04N 1/407* (2006.01)
*G06T 5/00* (2006.01)
*G06K 9/40* (2006.01)

(52) U.S. Cl.
USPC ........... 358/3.27; 358/1.9; 358/2.1; 358/3.06; 358/3.13; 358/3.15; 358/3.26; 358/533; 358/534; 358/536; 382/254; 382/266; 382/269

(58) Field of Classification Search
USPC .............. 358/3.03–3.2, 3.26–3.27, 533–536; 382/254–269
See application file for complete search history.

(56) References Cited

U.S. PATENT DOCUMENTS

| | | | |
|---|---|---|---|
| 5,293,430 A | 3/1994 | Shiau et al. | |
| 5,404,411 A | 4/1995 | Banton et al. | |
| 5,617,216 A | 4/1997 | Wada | |
| 5,765,029 A | 6/1998 | Schweid et al. | |
| 5,850,474 A | 12/1998 | Fan et al. | |
| 5,959,290 A | 9/1999 | Schweid et al. | |
| 6,020,979 A | 2/2000 | Zeck et al. | |
| 6,130,966 A | 10/2000 | Sekine et al. | |
| 6,144,489 A | 11/2000 | Wilson et al. | |
| 6,240,205 B1 | 5/2001 | Fan et al. | |
| 6,275,303 B1 | 8/2001 | Fukaya | |
| 6,343,159 B1 | 1/2002 | Cuciurean-Zapan | |
| 6,594,401 B1 | 7/2003 | Metcalfe et al. | |
| 6,760,126 B1 | 7/2004 | Kritayakirana et al. | |
| 6,829,064 B1 * | 12/2004 | Yu et al. | 358/3.15 |
| 6,975,428 B1 * | 12/2005 | Ernst et al. | 358/1.9 |
| 7,043,080 B1 | 5/2006 | Dolan | |
| 7,079,281 B1 | 7/2006 | Ng et al. | |

(Continued)

FOREIGN PATENT DOCUMENTS

| | | |
|---|---|---|
| EP | 0683599 | 11/1995 |
| EP | 1107577 | 6/2001 |

(Continued)

OTHER PUBLICATIONS

JPO machine translation of JP 2005-059444.*

(Continued)

*Primary Examiner* — Richard Zhu
(74) *Attorney, Agent, or Firm* — Michael J. Nickerson; Basch & Nickerson LLP

(57) ABSTRACT

A system and method converts pixels of continuous image data to pixels of binary image data using a halftone screen corresponding to a predetermined reduced coverage percentage; determines if a target pixel of binary image data is a non-white pixel; compares a window of pixels of binary image data with a predetermined pattern of pixels of binary image data corresponding to the predetermined reduced coverage percentage; determines that the target pixel is a non-edge pixel; and reduces the number of non-white pixels in the binary image data based upon the determination that the target pixel is a non-edge pixel.

18 Claims, 3 Drawing Sheets

(56) References Cited

U.S. PATENT DOCUMENTS

| | | | |
|---|---|---|---|
| 7,079,287 | B1 | 7/2006 | Ng et al. |
| 7,239,430 | B2 | 7/2007 | Shiau et al. |
| 7,251,061 | B2* | 7/2007 | Larson et al. ............. 358/3.27 |
| 7,352,490 | B1 | 4/2008 | Tse et al. |
| 7,609,411 | B2 | 10/2009 | Silverbrook et al. |
| 7,706,021 | B2 | 4/2010 | Kaburagi |
| 8,054,506 | B2* | 11/2011 | Shin ............. 358/3.15 |
| 2002/0196467 | A1 | 12/2002 | Delhoune et al. |
| 2004/0066538 | A1 | 4/2004 | Rozzi |
| 2004/0114185 | A1 | 6/2004 | Shiau et al. |
| 2005/0024685 | A1* | 2/2005 | Krol et al. ............. 358/3.11 |
| 2005/0052468 | A1 | 3/2005 | Kroon |
| 2005/0163374 | A1 | 7/2005 | Ferman et al. |
| 2005/0206948 | A1 | 9/2005 | Uejo |
| 2005/0270582 | A1* | 12/2005 | Hara ............. 358/2.1 |
| 2006/0132850 | A1 | 6/2006 | Banton et al. |
| 2007/0103731 | A1 | 5/2007 | Tse et al. |
| 2007/0139718 | A1* | 6/2007 | Kuo ............. 358/3.27 |
| 2008/0049238 | A1 | 2/2008 | Nagarajan et al. |
| 2008/0239401 | A1 | 10/2008 | Stevens |
| 2009/0034002 | A1* | 2/2009 | Shibaki et al. ............. 358/2.1 |
| 2010/0046856 | A1 | 2/2010 | Bai et al. |
| 2011/0032551 | A1 | 2/2011 | Faber et al. |

FOREIGN PATENT DOCUMENTS

| | | | |
|---|---|---|---|
| EP | 1583064 | | 10/2005 |
| EP | 1601184 | | 11/2005 |
| EP | 1722330 | | 3/2009 |
| GB | 2291308 | | 1/1996 |
| JP | 09051431 | | 2/1997 |
| JP | 2005059444 A | * | 3/2005 |
| WO | WO9930547 | | 6/1999 |
| WO | WO9933257 | | 7/1999 |

OTHER PUBLICATIONS

Aghadasi et al.; Reduction of Boundary Artifacts in Image Restoration; IEEE Transactions on Image Processing, Vol. 5, No. 4; Apr. 1996; pp. 611-618.

He et al; Boundary Stitching Algorith for Parallel Implementation of Error Diffusion ; Color Imaging IX: Processing, Hardcopy, and Applications, San Jose, California; Jan. 18, 2004; p. 344-355; ISBN / ISSN: 0-8194-5196-7.

Maxfield, C.; Hug an Xor Gate Today: An Introduction to Reed-Muller Logic; EDN Access for Design by Design; Mar. 1, 1996; 6 Pages.

JP09-051431 Abstract and Machine Translation.

7,239,430—The Prosecution History of US Patent 7,239,430 Issued July 3, 2007 (U.S. Appl. No. 10/318,614, filed December 12, 2002, Published June 17, 2004 As US 2004-0114185 A1 ;Inventors Shiau et al.

U.S. Appl. No. 10/655,719—The Prosecution History as of November 22, 2010 of U.S. Appl. No. 10/655,719.

U.S. Appl. No. 11/694,378—The Prosecution History as of April 24, 2012 for U.S. Appl. No. 11/694,378, filed Mar. 30, 2007, Published October 2, 2008, as US-2008-0239401-A1 ; Inventor: Michael Dale Stevens.

EP06113615.6—A European Office Action Dated October 15, 2009 for European Patent Application 06113615.6 Which Corresponds to U.S. Appl. No. 11/126,970.

EP06113615.6—A European Search Report Dated February 25, 2009 for European Patent Application 06113615.6 Which Corresponds to U.S. Appl. No. 11/126,970.

U.S. Appl. No. 12/467,441—The File History of U.S. Appl. No. 12/467,441, filed May 18, 2009 (Published Nov. 18, 2010 as US-2010-0290089-A1); Inventor: Michael Dale Stevens.

* cited by examiner

METHOD AND SYSTEM FOR PRESERVING IMAGE QUALITY IN AN ECONOMY PRINT MODE

BACKGROUND

Conventional digital reprographic systems receive electronic image(s), which are passed to an image processing unit. The image processing unit may be a combination of software and hardware elements that accepts the electronic images from a multiplicity of sources and performs operations needed to convert the images to the format compatible with the output path of the digital reprographic system.

For example, a conventional image processing unit may convert continuous tone image data into binary image data. Moreover, the conventional image processing unit may convert the binary image data into a reduced coverage (economy mode or draft mode) bitmap of binary image data.

Conventional digital reprographic systems convert image data into a reduced coverage (economy mode or draft mode) bitmap of binary image data to save toner or ink usage. The economy mode may have the same resolution as a regular print mode in a conventional digital reprographic system, but toner or ink usage is reduced, by a color table or a transfer function, for example. However, when solid colors (100% coverage) are reduced to a lower coverage, text and fine lines suffer due to halftoning, resulting in jagged text and dithered lines.

Conventionally, when printing in an economy mode, a data stream representing the image may be processed so that the printer uses less marking material (ink or toner) to print the image than it would if the processing was not performed.

More specifically, conventional digital reprographic systems operate by printing a series of dots or spots (pixels) of marking material on a recording medium to produce the rendered image. To reduce the amount of marking material used in rendering, conventionally black (non-white) regions in the image are modified to halftone grey regions. This is conventionally achieved by removing dots or spots (pixels) corresponding to marking material.

However, removing dots or spots (pixels) corresponding to marking material at the edges of text or shape can result in undesirable jaggies (jagged text) or dithered lines.

Thus, it would be desirable to provide a method or digital reprographic system that reduces marking material (toner or ink) usage while preserving the quality of text and fine lines.

Furthermore, it would be desirable to provide a method or digital reprographic system that reduces marking material (toner or ink) usage while rendering text edges and fine lines at 100% coverage and halftoning the inside areas, away from edges, to a lower coverage.

It would also be desirable to process halftoned bitmaps while preserving text edges and fine lines while reducing other areas to much lower coverage, thereby realizing an economy mode rendered image with high quality.

BRIEF DESCRIPTION OF THE DRAWING

The drawings are only for purposes of illustrating various embodiments and are not to be construed as limiting, wherein.

DETAILED DESCRIPTION

Figure 1:
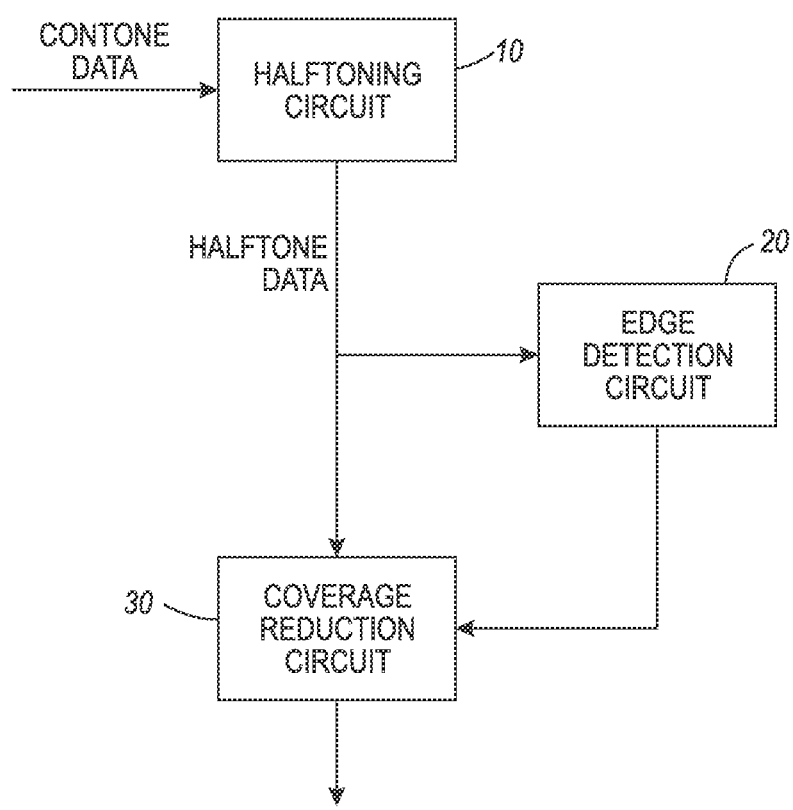
FIG. 1 illustrates a block diagram of a system for preserving edges in an image when rendering the image in an economy print mode.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 shows a block diagram of a system for preserving edges in an image when rendering the image in an economy print mode.

As illustrated in FIG. 1, a digital reprographic machine (printing device) includes a halftoning circuit 10 to convert pixels of continuous image data to pixels of binary image data using a halftone screen corresponding to a predetermined reduced coverage percentage. An edge detection circuit 20 is operatively connected to the halftoning circuit 10. The edge detection circuit 20 determines a non-edge pixel in the binary image data.

The edge detection circuit 20 determines if a target pixel of binary image data in a window of pixels of binary image data is a non-white pixel; and compares, when it is determined that the target pixel of binary image data in a window of pixels of binary image data is a non-white pixel, the window of pixels of binary image data with a predetermined pattern of pixels of binary image data corresponding to the predetermined reduced coverage percentage.

The edge detection circuit 20 determines that the target pixel is a non-edge pixel when it is determined that every non-white pixel location in the predetermined pattern of pixels of binary image data corresponds to a non-white pixel location in the window of pixels of binary image data.

The halftoning circuit 10 and the edge detection circuit 20 are operatively connected to a coverage reduction circuit 30. The coverage reduction circuit 30 reduces, corresponding to a predetermined reduced coverage percentage, the number of non-white pixels in the binary image data when it is determined that the target pixel is a non-edge pixel. The coverage reduction circuit 30 also prevents a reduction in the number of non-white pixels in the binary image data when it is determined that the target pixel is an edge pixel.

The reduced coverage circuit 30 logically ANDs, when it is determined that the target pixel is a non-edge pixel, the target pixel (one pixel) and the corresponding pattern pixel.

It is noted that edge detection circuit 20 and reduced coverage circuit 30 may be combined in the same circuit or module.

Figure 2:
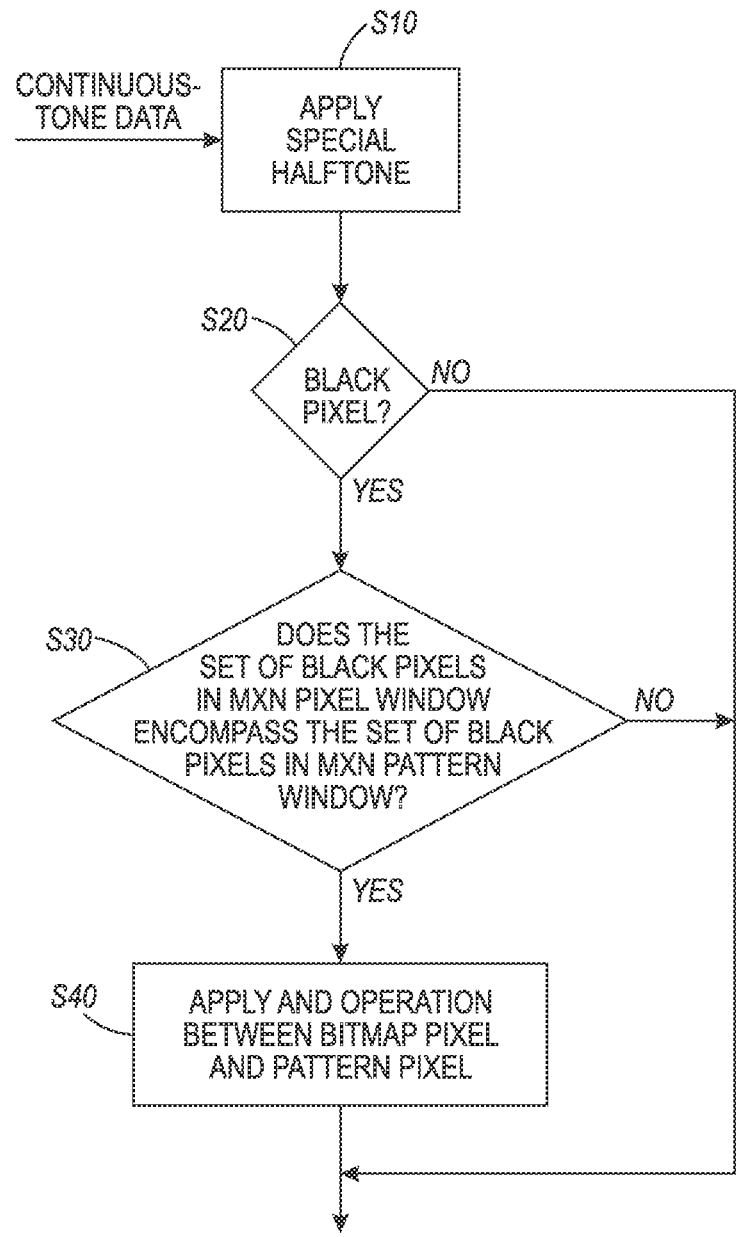
FIG. 2 illustrates a flowchart showing the preservation of edges in an image when rendering the image in an economy print mode.

FIG. 2 illustrates a flowchart showing the preservation of edges in an image when rendering the image in an economy print mode.

It is noted that FIG. 2 illustrates a process for black pixels; however, it is noted that the process of FIG. 2 can also be applied to color. In other words, the use of the term "black pixels" can mean full coverage pixels (100% toner or colorant, cyan, magenta, yellow or black).

As illustrated in FIG. 2, to preserve edges in an image when rendering the image in an economy print mode pixels of continuous image data are converted to pixels of binary image data using a halftone screen corresponding to a predetermined reduced coverage percentage, at step S10. At step S20, it is determined if a target pixel of binary image data in a window of pixels of binary image data is a non-white pixel, and when it is determined that the target pixel of binary image data in a window of pixels of binary image data is a non-white pixel, the window of pixels of binary image data is compared with a predetermined pattern of pixels of binary image data corresponding to the predetermined reduced coverage percentage, at step S30.

Step S30 determines that the target pixel is a non-edge pixel when it is determined that every non-white pixel location in the predetermined pattern of pixels of binary image data corresponds to a non-white pixel location in the window of pixels of binary image data.

At step S40, the number of non-white pixels in the binary image data is reduced, corresponding to the predetermined reduced coverage percentage, when it is determined that the target pixel is a non-edge pixel.

The reduced coverage of step S40 logically ANDs, when it is determined that the target pixel is a non-edge pixel, the target pixel (one pixel) and the corresponding pattern pixel.

Figure 3:
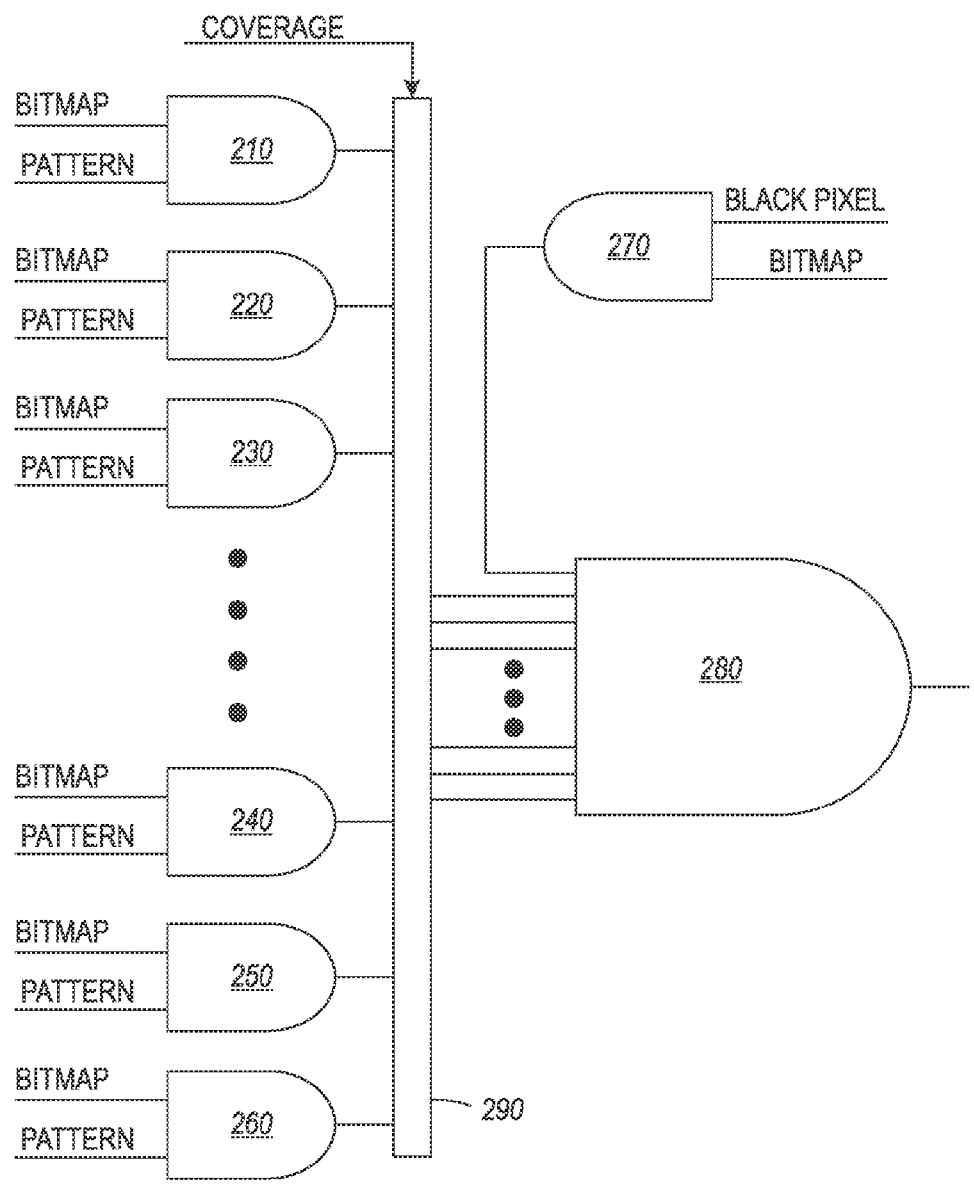
FIG. 3 illustrates a block diagram for determining whether a pixel is a non-edge pixel.

FIG. 3 illustrates a block diagram for determining whether a pixel is a non-edge pixel.

As illustrated in FIG. 3, each pixel of the window of the binary image data (bitmap image data) is logically ANDed (210, 220, 230, 240, 250, and 260) with a predetermined pattern of pixels of binary image data (patterned image data) corresponding to the predetermined reduced coverage percentage.

A selection circuit 290 determines which logically ANDed results are used in determining the edge state of the target pixel.

A logic AND circuit 270, as illustrated in FIG. 3, logically ANDs the value of the target pixel with the value of a black pixel to determine if the target pixel is a black pixel.

The passed through results from selection circuit 290 and the logically ANDed result from logic AND circuit 270 are logically ANDed by logic AND circuit 280 to determine if the target pixel is a non-edge pixel. If the logically ANDed result of AND circuit 280 is a logic one, the target pixel is a non-edge pixel.

The method and system described above provide reduced marking material (toner or ink) usage while preserving the quality of text and fine lines, wherein text edges and fine lines are rendered at 100% coverage, and the inside areas away from edges are halftoned to a lower coverage.

To preserve text edges and fine lines, solid text edges and fine lines are not halftoned.

To better describe the process and system described above, the following example will be utilized. In this example, it is assumed that the reduced coverage (economy mode) requires a maximum of 65% marking material (toner or ink) coverage to produce a much reduced density level.

Moreover, for this example, it is assumed that the rendering is done in black and white, but the processes can be easily extended to color. Furthermore, it is assumed that the incoming gray image has a range of 0 to 255, where a gray level of 0 represents black, and a gray level of 255 represents white. Lastly, it is assumed that in the halftoned bitmap, a value of 0 represents white, and a value of 1 represents black.

In this example, the reduced coverage pattern refers to a pattern at a certain coverage; for example, a 65% pattern, or a 65% black pattern, or a 65% coverage pattern, mean a pattern with 65% marking material (toner/ink) coverage; i.e., 65% of the paper is covered by marking material (toner/ink).

In this example, a special halftone for the economy mode is generated from a normal halftone. For example, a halftone can be generated for a normal print mode at 600×600 dpi. Since the desired coverage is 65%, 35% of the lowest thresholds in the halftone screen are set to a value of 1, and the other thresholds (65% of the threshold) are linearly scale to a range of 2-255.

More specifically, for example, depending on the histogram of the thresholds, if all thresholds less than 51 make up 35% of the threshold array, these thresholds need to be set to a value of 1. The other thresholds, for example, from value 51 to value 255, will be linearly scaled to 2-255.

It is noted that a threshold of 1 at a location will produce a black pixel at that location only when the incoming gray level is 0 (black), and will produce a white pixel for any other gray level because the halftoning is done using the following formula: if gray level<threshold, set halftone pixel to 1 (black pixel); otherwise (gray level>=threshold) set halftone pixel to 0 (white pixel).

So for a gray level of 0, all the halftoned pixels will have values of 1 (black pixels), but for a gray level of 1, 35% of the halftoned pixels will have values of 0 because 35% of the thresholds are 1's, resulting in white pixels at those locations according to the halftoning formula above.

As mentioned above, the other thresholds from 51 to 255 are scaled to 2-255. To visualize the effect of this halftone on a gray scale ramp, starting from black to white, the halftoned ramp will start at 100% black, then suddenly drops to 65% black coverage, and from there on, the black coverage gradually decreases to white at the other end of the ramp.

It is noted that when scaling the values from 51-255 to 2-255, the scaling is going from a smaller range to a larger range, so some threshold values may be missing after scaling, for example, there may not be thresholds in the screen with values of 6, 11, 16, etc, resulting in a loss of some gray levels.

To avoid this problem, the original screen before the scaling may have a higher range, for example, instead of a range of 0-255, assign a different value to each threshold of the screen. In other words, for a 96×96 screen, it means a range of 0-9215 (96*96−1).

This special halftone should keep black at 100% coverage, but scale the other gray levels to a maximum of 65% coverage. This special halftone screen is used to halftone any continuous tone data.

An alternative to using this special halftone is to use a special transfer function that is not continuous.

Once the continuous tone data has been halftoned using the special halftone screen described above, the halftoned bitmap is then processed. The goal is to reduce black from 100% to a much lower coverage, 65% in this example, while preserving text edges and fine lines.

To reduce black to 65% coverage, a halftone pattern at 65% coverage is used, and this pattern is tiled across the halftoned bitmap. When a pixel location in the halftoned bitmap corresponds to a 0 (white) on the 65% halftone pattern, the value of that pixel in the bitmap will be set to 0.

In one example, an AND operation is performed between the target pixel of the bitmap and the corresponding pixel in the pattern. Due to the correlation of the halftone patterns at different gray levels, for example, white pixels in a 65% black pattern remain white pixels in a 64% black pattern, which is lighter than the 65% pattern. Halftoned areas at all other gray levels except black won't be affected by this AND operation.

The resulting black to white gray scale ramp is a continuous ramp starting at 65% black coverage on one end to 0% black coverage (white) at the other end.

It is noted that the gray level 0 is rendered to 65% black, and gray level 1 is also at 65% in the example described above. This usually should not present a problem, but if it is a problem, the two levels different are made different. More specifically, the coverage for gray level 1 may be set to a desired coverage that is slightly less than 65%, for example 64.5%, when the special halftone is generated.

To ensure that text edges and fine lines are not affected when applying the 65% pattern to reduce 100% black to 65% black, a determination of which pixels are text edges and fine lines is realized.

To make this determination, the 65% pattern is overlayed on the halftoned bitmap, and a window M×N around the current halftoned pixel being processed is selected, for example, a 5×5 window centered around the current (target) pixel can be selected. If the centered (target) pixel is a black pixel (white pixels in the bitmaps are not touched), the pixels in the 5×5 window are compared against the pixels in the corresponding 5×5 window of the 65% halftoned pattern.

The black pixels in the 5×5 window in the halftoned bitmap have to encompass the black pixels in the 5×5 window in the corresponding 65% pattern in order to qualify the target pixel as a non-edge pixel.

In other words, for every black pixel in the 5×5 window in the 65% pattern, the corresponding location in the 5×5 window in the halftoned bitmap has to be a black pixel as well.

As described above, in an area with 100% black away from the edges, the above conditions are met such that these black pixels qualified as non-edge black pixels and will be reduced to 65% coverage.

On the other hand, if a square with gray level 0 and a square with gray level 1 are placed next to each other, due to the special halftone, gray level 0 will be rendered as 100% black, and gray level 1 will be rendered as 65% black. In this case, the above conditions are met at the border between the two squares, so the border pixels would be reduced to 65% coverage, ensuring a smooth transition from gray level 0 and gray level 1.

At text edges, the above conditions are not met because the black pixels in the 5×5 window do not encompass the black pixels in the corresponding 5×5 window of the 65% black pattern, so text edges won't be dithered to the 65% black pattern.

In text area inside the edges, the 5×5 window should contain solid black, so the above conditions are met, which means that areas inside the text edges will be dithered to 65%.

For fine lines, the above conditions are not met, so fine lines are not affected.

It is noted that when taking into consideration variations in images, the condition above can be loosened. Instead of requiring that the set of black pixels in the 5×5 window in the bitmap encompass the set of black pixels in the 5×5 window of the 65% black pattern, it can be required that the set of black pixels in the first window encompass the set of black pixels in the second window of the 55% black pattern (lighter than the 65% black pattern), not the 65% black pattern. However, when this modified condition is met, the 65% black pattern is still applied to take away certain black pixels to reduce density.

In other words, the pattern used for finding non-edge pixels and the pattern used for taking away black pixels can be generated from different levels. The former should be the same or a lighter pattern than the latter.

In summary, a system for maintaining edge pixels in a reduced coverage image includes a halftoning circuit to convert pixels of continuous image data to pixels of binary image data using a halftone screen corresponding to a predetermined reduced coverage percentage; and an edge detection circuit to determine a non-edge pixel in the binary image data. The edge detection circuit determines if a target pixel of binary image data in a window of pixels of binary image data is a non-white pixel; compares, when it is determined that the target pixel of binary image data in a window of pixels of binary image data is a non-white pixel, the window of pixels of binary image data with a predetermined pattern of pixels of binary image data corresponding to the predetermined reduced coverage percentage; and determines that the target pixel is a non-edge pixel when it is determined that each non-white pixel location in the predetermined pattern of pixels of binary image data corresponds to a non-white pixel location in the window of pixels of binary image data.

The edge detection circuit may determine that the target pixel is an edge pixel when it is determined that that one non-white pixel location in the predetermined pattern of pixels of binary image data fails to correspond to a non-white pixel location in the window of pixels of binary image data.

The non-white pixel may be a black pixel.

The halftone screen may have a predetermined number of thresholds, the halftone screen having a first number of thresholds set to a first value, the first number being a first percentage of the predetermined number, the first percentage being equal to 100% minus the predetermined reduced coverage percentage, the halftone screen having a second number of linearly scaled thresholds, the second number being a second percentage of the predetermined number, the second percentage being equal to the predetermined reduced coverage percentage.

The halftoning circuit may convert a pixel of continuous image data having a value less than a threshold to a non-white pixel of binary image data.

The halftoning circuit may convert a pixel of continuous image data having a value equal to or greater than a threshold to a white pixel of binary image data.

The system may also include a reduced coverage circuit to reduce, corresponding to the predetermined reduced coverage percentage, the number of non-white pixels in the binary image data based upon the determination that the target pixel is a non-edge pixel.

The reduced coverage circuit may prevent a reduction in the number of non-white pixels in the binary image data based upon the determination that the target pixel is an edge pixel.

The reduced coverage circuit may, on a pixel-by-pixel basis, logically AND, when it is determined that the target pixel is a non-edge pixel, the target pixel and the corresponding pattern pixel.

A method for maintaining edge pixels in a reduced coverage image, includes converting pixels of continuous image data to pixels of binary image data using a halftone screen corresponding to a predetermined reduced coverage percentage; determining if a target pixel of binary image data in a window of pixels of binary image data is a non-white pixel; comparing, when it is determined that the target pixel of binary image data in a window of pixels of binary image data is a non-white pixel, the window of pixels of binary image data with a predetermined pattern of pixels of binary image data corresponding to the predetermined reduced coverage percentage; and determining that the target pixel is a non-edge pixel when it is determined that every non-white pixel location in the predetermined pattern of pixels of binary image data corresponds to a non-white pixel location in the window of pixels of binary image data.

The method may determine that the target pixel is an edge pixel when it is determined that one non-white pixel location in the predetermined pattern of pixels of binary image data fails to correspond to a non-white pixel location in the window of pixels of binary image data.

The non-white pixel may be a black pixel.

The halftone screen may have a predetermined number of thresholds, the halftone screen having a first number of thresholds set to a first value, the first number being a first percentage of the predetermined number, the first percentage being equal to 100% minus the predetermined reduced coverage percentage, the halftone screen having a second number of linearly scaled thresholds, the second number being a second percentage of the predetermined number, the second percentage being equal to the predetermined reduced coverage percentage.

The converting of the pixels of continuous image data may convert a pixel of continuous image data having a value less than a threshold to a non-white pixel of binary image data.

The converting of the pixels of continuous image data may convert a pixel of continuous image data having a value greater than a threshold to a white pixel of binary image data.

The method may reduce, corresponding to the predetermined reduced coverage percentage, the number of non-white pixels in the binary image data based upon the determination that the target pixel is a non-edge pixel.

The method may prevent a reduction in the number of non-white pixels in the binary image data based upon the determination that the target pixel is an edge pixel.

The reducing of the number of non-white pixels in the binary image data may, on a pixel-by-pixel basis, logically AND, when it is determined that the target pixel is a non-edge pixel, the target pixel and the corresponding pattern pixel.

A method for maintaining edge pixels in a reduced coverage image converts pixels of continuous image data to pixels of binary image data using a halftone screen corresponding to a predetermined reduced coverage percentage; determines if a target pixel of binary image data in a window of pixels of binary image data is a non-white pixel; compares, when it is determined that the target pixel of binary image data in a window of pixels of binary image data is a non-white pixel, the window of pixels of binary image data with a predetermined pattern of pixels of binary image data corresponding to a reduced coverage percentage that is less than the predetermined reduced coverage percentage; determines that the target pixel is a non-edge pixel when it is determined that every non-white pixel location in the predetermined pattern of pixels of binary image data corresponds to a non-white pixel location in the window of pixels of binary image data; and reduces, corresponding to the predetermined reduced coverage percentage, the number of non-white pixels in the binary image data based upon the determination that the target pixel is a non-edge pixel.

The reducing of the number of non-white pixels in the binary image data may, on a pixel-by-pixel basis, logically AND, when it is determined that the target pixel is a non-edge pixel, the target pixel and the corresponding pattern pixel.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for maintaining edge pixels in a reduced coverage image, comprising:
    a halftoning circuit to convert pixels of continuous image data to pixels of binary image data using a halftone screen corresponding to a predetermined reduced coverage percentage, the halftone screen having a predetermined number of thresholds, the halftone screen having a first number of thresholds set to a first value, the first number being a first percentage of the predetermined number, the first percentage being equal to 100% minus the predetermined reduced coverage percentage, the halftone screen having a second number of linearly scaled thresholds, the second number being a second percentage of the predetermined number, the second percentage being equal to the predetermined reduced coverage percentage; and
    an edge detection circuit to determine a non-edge pixel in the binary image data;
    said edge detection circuit determining if a target pixel of binary image data in a window of pixels of binary image data is a non-white pixel;
    said edge detection circuit comparing, when said edge detection circuit determines that the target pixel of binary image data in a window of pixels of binary image data is a non-white pixel, the window of pixels of binary image data with a predetermined pattern of pixels of binary image data corresponding to the predetermined reduced coverage percentage, said predetermined pattern of pixels of binary image data not including pixels of binary image data converted from the pixels of continuous image data;
    said edge detection circuit determining that the target pixel is a non-edge pixel when said edge detection circuit determines that every non-white pixel location in the predetermined pattern of pixels of binary image data corresponds to a non-white pixel location in the window of pixels of binary image data.

2. The system as claimed in claim 1, wherein said edge detection circuit determines that the target pixel is an edge pixel when said edge detection circuit determines that one non-white pixel location in the predetermined pattern of pixels of binary image data fails to correspond to a non-white pixel location in the window of pixels of binary image data.

3. The system as claimed in claim 1, wherein the non-white pixel is a black pixel.

4. The system as claimed in claim 1, wherein said halftoning circuit converts a pixel of continuous image data having a value less than a threshold to a non-white pixel of binary image data.

5. The system as claimed in claim 1, wherein said halftoning circuit converts a pixel of continuous image data having a value equal to or greater than a threshold to a white pixel of binary image data.

6. The system as claimed in claim 1, further comprising:
    a reduced coverage circuit to reduce, on a pixel-by-pixel basis, corresponding to the predetermined reduced coverage percentage, the number of non-white pixels in the binary image data based upon said edge detection circuit determining that the target pixel is a non-edge pixel.

7. The system as claimed in claim 6, wherein said reduced coverage circuit prevents a reduction in the number of non-white pixels in the binary image data based upon said edge detection circuit determining that the target pixel is an edge pixel.

8. The system as claimed in claim 6, wherein said reduced coverage circuit logically ANDs, when said edge detection circuit determines that the target pixel is a non-edge pixel, the target pixel and the corresponding pattern pixel.

9. A method for maintaining edge pixels in a reduced coverage image, comprising:
    (a) converting pixels of continuous image data to pixels of binary image data using a halftone screen corresponding to a predetermined reduced coverage percentage, the halftone screen having a predetermined number of thresholds, the halftone screen having a first number of thresholds set to a first value, the first number being a first percentage of the predetermined number, the first percentage being equal to 100% minus the predetermined reduced coverage percentage, the halftone screen having a second number of linearly scaled thresholds, the second number being a second percentage of the predetermined number, the second percentage being equal to the predetermined reduced coverage percentage;

(b) determining if a target pixel of binary image data in a window of pixels of binary image data is a non-white pixel;

(c) comparing, when it is determined that the target pixel of binary image data in a window of pixels of binary image data is a non-white pixel, the window of pixels of binary image data with a predetermined pattern of pixels of binary image data corresponding to the predetermined reduced coverage percentage, the predetermined pattern of pixels of binary image data not including pixels of binary image data converted from the pixels of continuous image data; and (d) determining that the target pixel is a non-edge pixel when it is determined that every non-white pixel location in the predetermined pattern of pixels of binary image data corresponds to a non-white pixel location in the window of pixels of binary image data.

10. The method as claimed in claim 9, further comprising:

(e) determining that the target pixel is an edge pixel when it is determined that one non-white pixel location in the predetermined pattern of pixels of binary image data fails to correspond to a non-white pixel location in the window of pixels of binary image data.

11. The method as claimed in claim 9, wherein the non-white pixel is a black pixel.

12. The method as claimed in claim 9, wherein the converting of the pixels of continuous image data converts a pixel of continuous image data having a value less than a threshold to a non-white pixel of binary image data.

13. The method as claimed in claim 9, wherein the converting of the pixels of continuous image data converts a pixel of continuous image data having a value greater than a threshold to a white pixel of binary image data.

14. The method as claimed in claim 9, further comprising:

(e) reducing, on a pixel-by-pixel basis, corresponding to the predetermined reduced coverage percentage, the number of non-white pixels in the binary image data based upon the determination that the target pixel is a non-edge pixel.

15. The method as claimed in claim 14, further comprising:

(f) preventing a reduction in the number of non-white pixels in the binary image data based upon the determination that the target pixel is an edge pixel.

16. The method as claimed in claim 14, wherein the reducing of the number of non-white pixels in the binary image data logically ANDs, when it is determined that the target pixel is a non-edge pixel, the target pixel and the corresponding pattern pixel.

17. A method for maintaining edge pixels in a reduced coverage image, comprising:

(a) converting pixels of continuous image data to pixels of binary image data using a halftone screen corresponding to a predetermined reduced coverage percentage, the halftone screen having a predetermined number of thresholds, the halftone screen having a first number of thresholds set to a first value, the first number being a first percentage of the predetermined number, the first percentage being equal to 100% minus the predetermined reduced coverage percentage, the halftone screen having a second number of linearly scaled thresholds, the second number being a second percentage of the predetermined number, the second percentage being equal to the predetermined reduced coverage percentage;

(b) determining if a target pixel of binary image data in a window of pixels of binary image data is a non-white pixel;

(c) comparing, when it is determined that the target pixel of binary image data in a window of pixels of binary image data is a non-white pixel, the window of pixels of binary image data with a predetermined pattern of pixels of binary image data corresponding to a reduced coverage percentage that is less than the predetermined reduced coverage percentage, the predetermined pattern of pixels of binary image data not including pixels of binary image data converted from the pixels of continuous image data;

(d) determining that the target pixel is a non-edge pixel when it is determined that every non-white pixel location in the predetermined pattern of pixels of binary image data that is less than the predetermined reduced coverage percentage corresponds to a non-white pixel location in the window of pixels of binary image data; and (e) reducing, corresponding to the predetermined reduced coverage percentage, the number of non-white pixels in the binary image data based upon the determination that the target pixel is a non-edge pixel.

18. The method as claimed in claim 17, wherein the reducing of the number of non-white pixels in the binary image data logically ANDs, when it is determined that the target pixel is a non-edge pixel, the target pixel and the corresponding pattern pixel.

\* \* \* \* \*